United States Patent [19]

Takahashi et al.

[11] Patent Number: 4,821,561
[45] Date of Patent: Apr. 18, 1989

[54] METHOD OF METERING AN AIR-GAP IN AN ELECTRIC ROTATING MACHINE

[75] Inventors: Keiji Takahashi, Kiryu; Mamoru Zennyoji, Ashikaga, both of Japan

[73] Assignee: Mitsuba Electric Mfg. Co., Ltd., Japan

[21] Appl. No.: 120,618

[22] Filed: Nov. 13, 1987

[30] Foreign Application Priority Data

Nov. 14, 1986 [JP] Japan .................................. 61-271619

[51] Int. Cl.⁴ .......................................... G01M 15/00
[52] U.S. Cl. ................................................... 73/118.1
[58] Field of Search ..................... 73/118.1, 117.3, 116; 29/593, 596, 598

[56] References Cited

U.S. PATENT DOCUMENTS

| | | | |
|---|---|---|---|
| 3,184,625 | 5/1965 | Farison | 310/59 |
| 3,220,581 | 12/1965 | Brewster et al. | 310/59 |
| 3,271,606 | 9/1966 | Collins | 310/263 |
| 3,305,740 | 2/1967 | Shano | 310/42 |
| 3,361,915 | 1/1968 | Baker | 310/68 |
| 3,422,339 | 1/1969 | Baker | 321/8 |
| 3,538,362 | 11/1970 | Cheetham et al. | 310/68 |
| 3,714,484 | 1/1973 | Habert | 310/263 |
| 3,831,045 | 8/1974 | Anislmov et al. | 310/52 |
| 4,028,568 | 6/1977 | Tatsumi et al. | 310/42 |
| 4,087,713 | 5/1978 | Binder | 310/266 |
| 4,406,961 | 9/1983 | Pfluger et al. | 310/68 |
| 4,418,295 | 11/1983 | Shiga | 310/59 |
| 4,464,594 | 8/1984 | Matsumoto et al. | 310/63 |
| 4,492,885 | 1/1985 | Kitamura et al. | 310/62 |
| 4,500,772 | 2/1985 | Ahner et al. | 219/209 |
| 4,549,103 | 10/1985 | Shiga | 310/60R |
| 4,617,485 | 10/1986 | Nakamura et al. | 310/65 |

FOREIGN PATENT DOCUMENTS

| 192455 | 11/1983 | Japan | 29/593 |
|---|---|---|---|
| 677039 | 7/1979 | U.S.S.R. | 29/596 |

Primary Examiner—Jerry W. Myracle
Attorney, Agent, or Firm—Darby & Darby

[57] ABSTRACT

A method of metering an air-gap in an electric rotating machine comprising a rotor core provided integrally on a rotary shaft and a stator core arranged coaxially with the rotor core around the outer periphery thereof is disclosed, which method comprises measuring the width of the stator core in the radial direction prior to assembling the stator core and the rotor core, also measuring the position of an outer periphery of the stator core from the axis of the rotor core after the assembling, calculating the position of an inner periphery of the stator core from the axis of the rotor core based on the difference between the result of measurement of the width of the stator core in the radial direction measured prior to the assembling and the result of measurement of the position of the outer periphery of the stator core from the axis of the rotor core after the assembling, and further calculating the difference between the position of the inner periphery of the stator core and the position of the outer periphery of the rotor core based on the results of the measurements, the thus-obtained difference being defined as an air-gap between the stator core and the rotor core.

7 Claims, 4 Drawing Sheets

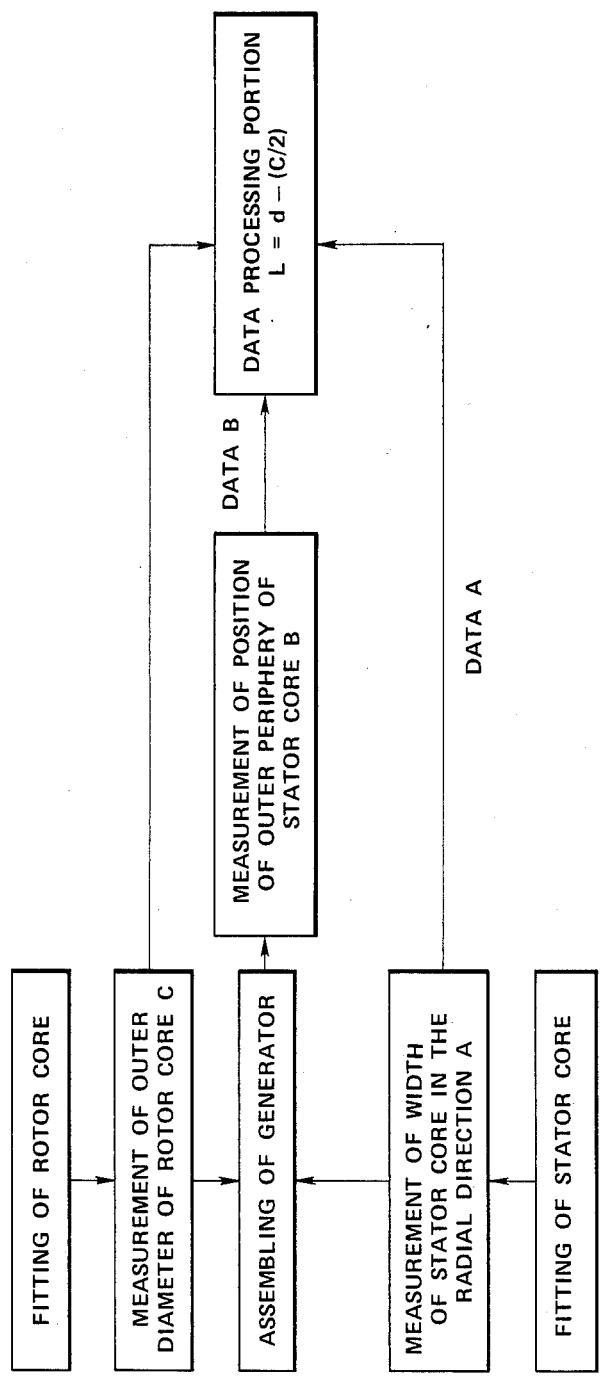

METHOD OF METERING AN AIR-GAP IN AN ELECTRIC ROTATING MACHINE

BACKGROUND OF THE INVENTION

1. Field of the Invention

This invention relates to a method of metering an air-gap in an electric rotating machine such as a generator for use in vehicles.

2. Description of Prior Art

Generally, electric rotating machines such as a generator for use in vehicles, e.g., cars include those which comprise a rotor core provided integrally on a rotary shaft and an open-type stator core which has an exposed outer periphery and is arranged coaxially with the rotor core around the outer periphery thereof as described in, for example, U.S. Pat. Nos. 4,488,070 and 4,419,597, and there is formed an air-gap of an appropriate width between the inner periphery of the stator core and the outer periphery of the rotor core in order to avoid the contact between the rotor core and the stator core while the former rotates. It is preferred to make the width of the air-gap as small as possible in order to obtain a high output electric rotating machine. However, when it is attempted to reduce the air-gap with view to rendering the machine high outputting the air-gap cannot be reduced too much in view of deviations encountered upon assembling the stator core and rotor core of dimensional tolerance or deformation of the rotor core which would occur due to high speed rotation. Heretofore, no measurement of air-gaps has been made for each article or generator, with the result that the precision of the measurement is poor. It has conventionally been adopted to set up an air-gap size which can sufficiently clear the allowance or dimensional tolerance large enough to be applicable to all the articles produced on a large scale which has been determined taking into consideration the above-described deviation in each article. As a result, air-gaps cannot but help being set up at an excessively large value since reduction in the air-gap could affect the reliability of the articles produced because the rotor core would otherwise contact the stator core due to deviation, deformation, etc. Needs for high output rotating machines, particularly generators, are not met satisfactorily and some improvements are desired.

SUMMARY OF THE INVENTION

It is an object of this invention to obviate the above-described defects of the prior art and provide a method of metering an air-gap in an electric rotating machine which is easy to carry out with high reliability.

As a result of extensive investigation it has now been found that the above-described object is achieved by measuring the thickness of the stator core after winding field wire and coating, measuring the outer diameter of the stator core after assembling and calculating the difference between the results. That is, this invention provides a method of metering an air-gap in an electric rotating machine comprising a rotor core provided integrally on a rotary shaft and a stator core arranged coaxially with the rotor core around the outer periphery thereof, which method comprises measuring the width of the stator core in the radial direction prior to assembling the stator core and the rotor core, also measuring the position of an outer periphery of the stator core from the axis of the rotor core after the assembling, calculating the position of an inner periphery of the stator core from the axis of the rotor core based on the difference between the result of measurement of the width of the stator core in the radial direction measured prior to the assembling and the result of measurement of the position of the outer periphery of the stator core from the axis of the rotor core after the assembling, and further calculating the difference between the position of the inner periphery of the stator core and the position of the outer periphery of the rotor core based on the results of the measurements, the thus-obtained difference being defined as an air-gap between the stator core and the rotor core.

With this construction, this invention facilitates metering of an air-gap in an electric rotating machine with high precision and thus is able to greatly contribute to render the electric rotating machine high outputting.

BRIEF DESCRIPTION OF THE DRAWINGS

The accompanying drawings illustrate an example of the method of metering an air-gap in an electric rotating machine according to this invention, in which:

FIG. 5 is a block diagram showing the procedures of controlling the measurement of the air-gap between the stator core and the rotor core.

DESCRIPTION OF PREFERRED EMBODIMENT

Figure 1:
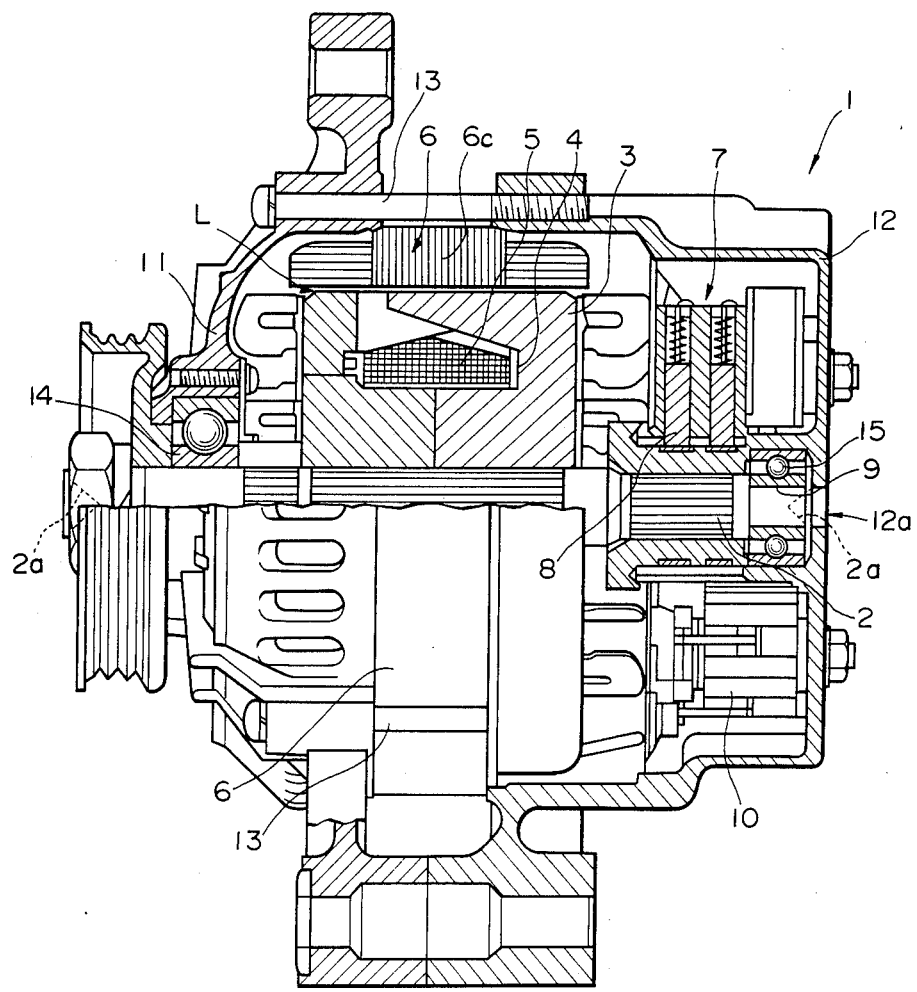
FIG. 1 is a partially cut-away side elevational view of a generator for vehicles.

An embodiment of this invention is described with reference to the attached drawings, in which reference numeral 1 designates a generator for use in vehicles. The generator 1 comprises various elements such as core shaft 2, a so-called Lundell type rotor core 3 fixed to the core shaft 2 as by force fitting, a coil bobbin 4 incorporated in the rotor core 3, a rotor coil 5 wound around the coil bobbin 4, a stator core 6, a stator coil 6c wound around the stator core 6, a brush holder 7, a plurality of brushes 8 supported as by springs through a brush holder 7, a plurality of slip rings 9 being in a slidable contact with the brushes 8, a rectifier 10 which rectifies generated alternating current, etc. This construction may be fundamentally the same as in the conventional generators such as those described in, for example, U.S. Pat. Nos. 4,488,070 and 4,419,597.

Usually, the generator 1 comprises casings, i.e., a front bracket 11 and a case bracket 12, which are integrally fastened to each other by a through bolt 13 screwed therethrough in such a manner that the stator core is inserted therebetween. The generator 1 is of an open type generator with the outer periphery of the stator core being exposed. The core shaft 2 is rotatably supported by bearings 14 and 15 provided in the brackets 11 and 12. In the method of this invention, an air-gap L between the outer periphery of the rotor core 3 fixed to the core shaft 2 and the inner periphery of the stator core 6 is measured.

For this purpose, necessary measurements on the stator core 6 are made at a stage prior to assembling the generator 1. Generally, the main body of the stator core 6 is comprised by a predetermined number of punched plates of a metal or alloy commonly used in the art laminated one on another or otherwise combined with each other. Further, the stator coil 6c is wound therearound and fitting of the stator core is completed after necessary treatments such as coating with an insulating coating. The width of each tooth 6a of the thus-fitted stator core 6 in the radial direction is measured. In this measurement, a pair of measurement equipments 16 and 17 such as eddy sensors comprising a pair of magnetic materials 16a and 17a are arranged so as to oppose the members to be measured and enable the measurement of the distance of the member to be measured, i.e., the stator core 6, from the magnetic materials 16 or 17 based on the loss of eddy current the amount of which depends on the distance from the magnetic material. Assuming the distance between the measurement equipments 16 and 17 is Z (a given distance and thus is known), and further assuming on the results of the measurements that the distance of the outer measurement equipment 16 from the outer periphery of the stator core 6 is x and the distance of the inner measurement equipment from the inner periphery of the tooth 6a of the stator core 6 is y, then the width A of the tooth 6a is given by the following equation:

$$A = Z - (x + y)$$

Figure 2:
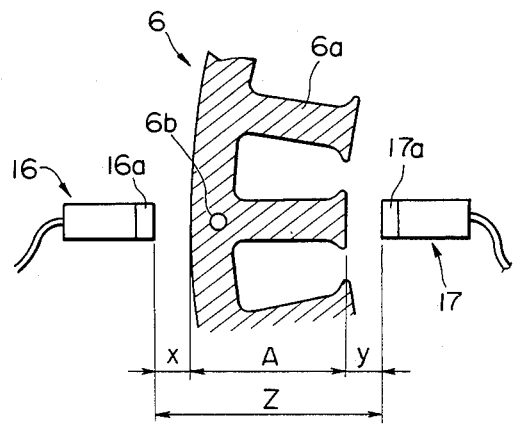
FIG. 2 is a schematic cross-section in the radial direction of a part of a stator core for illustrating the operation of measuring the width of a stator core in the radial direction.
Figure 3:
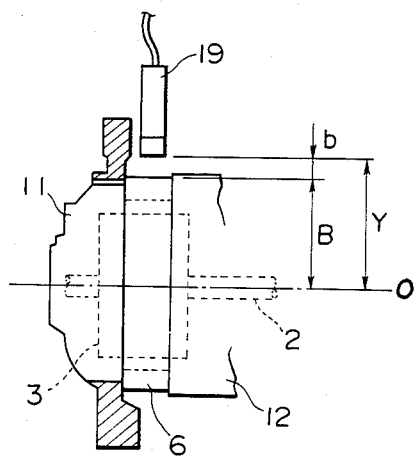
FIG. 3 is a schematical cross-section along the axis of the generator for illustrating the operation of measuring the position of an outer periphery of the stator core.

(cf. FIG. 2) and the value of the width A of each tooth 6a in the radial direction as a measurement data is sent to a data comparison and judgement portion of the measurement equipment.

On the other hand, the generator 1 after being assembled is fixedly supported using a jig (not shown) such that the position at which jig supports the generator is in the center of the core shaft 2. In this case, the case bracket 12 is provided with an opening 12a at the portion corresponding to or facing the core shaft 2 so as to allow one to see the end of the core shaft 2. In addition, a conical groove 2a is formed on each end of the core shaft 2 in alignment with the axis of the core shaft 2, and the generator 1 is supported at the conical grooves 2a using a jig (not shown). The position of the exposed portion of the stator core 6 from the axis of the core shaft is measured using a measurement equipment 19 which may be an eddy sensor similar to that described above used for the measurement of the width of the stator core 6. The measurement equipment 19 is arranged in a position at a distance Y from the center O of the core shaft 2 and the distance b between the outer periphery of the stator core 6 and the tip of the sensor of the measurement equipment 19 is measured. From the results of the measurements, the distance B of the center 0 of the core shaft 2 from the outer periphery of the stator core 6 in the state in which the stator core 6 is actually fitted is calculated according to the equation below:

$$B = Y - b$$

In the above case, the measurement of the width of the stator core 6 in the radial direction prior to assembling and the measurement of the position of an outer periphery of the stator core 6 after assembling must of course be made at the same position of the stator core 6. The alignment of the positions of the stator core 6 for measurement is performed by selecting as a starting point for both the measurements a groove 6b (cf. FIG. 2), for example, for the positioning of the outer periphery provided in the stator core 6 so as to correspond to a terminal portion of the field wire wound therearound. In the peripheral portion of the stator core 6 which is exposed there are sites where the through bolt 13 and a portion of the bracket are superimposed, measurement of the position of an outer periphery of the stator core corresponding to the superimposed portion is impossible and therefore this invention is not applicable to such portion.

Figure 4:
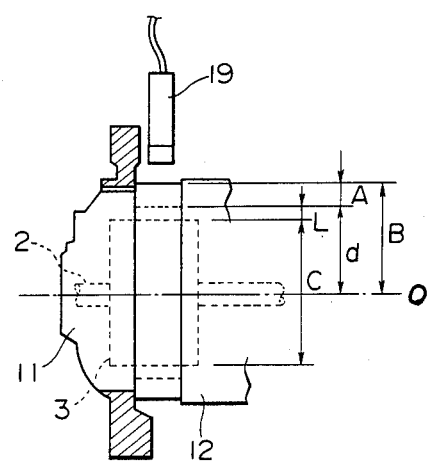
FIG. 4 is a schematical cross-section along the axis of the stator core for illustrating the operation of metering an air-gap between the stator core and the rotor core.

After calculation of the width A of the stator core 6 in the radial direction and the distance B of the outer periphery of the stator core, the difference therebetween indicates the actual inner diameter d of the stator core 6 in a state in which the generator 1 has been assembled (FIG. 4), which is calculated by the following equation:

$$d = B - A$$

On the other hand, the rotor core 3 has previously been measured for its outer diameter by means of a measurement means such as a plug gauge or a like. Assuming the diameter of the rotor core 3 is C, the air-gap L between the inner periphery of the stator core 6 and the outer periphery of the rotor core 3 is metered as expressed by the following equation;

$$L = d - (C/2)$$

The quality of products can be controlled based on the thus-calculated air-gap L.

As stated above, in this invention, the air-gap L between the stator core 6 and the rotor core 3, i.e., the clearance between the inner periphery of the stator core and the outer periphery of the rotor core, can be obtained continuously, easily and exactly. As the result, it is no longer necessary to set up the air-gap value at a large enough value which is determined taking into consideration deviations upon assembling for all the products manufactured on a large scale as in the case of the conventional method in which no air-gap is measured particularly, and the control of the quality of the products can be made based on the air-gap value L actually metered for each generator. Therefore, when the air-gap value L is set up to a small value required for making the products high outputting (e.g., a value smaller than the conventional one which is at about 0.5 mm) the control of the quality of the products required can be carried out easily and reliably so that the generator 1 can be produced as being with high precision and reliability with air-gap value L being highly controlled.

In the above construction, the position of an inner periphery of the stator core at sites where the through bolt 13 and the bracket overlaps is impossible to measure and the above-described continuous measurement is partly discontinued at such overlapped or superimposed sites. However, the portion where the measurement is impossible is rather limited as compared with the entire stator core and therefore there occurs substantially no problem.

Needless to say, this invention is not limited to the above example, and means for the measurement of the width of the stator core in the radial direction and of the position of an outer periphery of the stator core may be known measuring means such as one using light, etc. without resort to eddy sensors. Further, it is unnecessary to measure all the teeth but measurement may be carried out at appropriate intervals as by measuring every another tooth. According to this invention high performance electric rotating machines can be provided on a large scale at low costs.

What is claimed is:

1. A method of metering an air-gap in a electric rotating machine comprising a rotor core provided integrally on a rotary shaft and a stator core arranged coaxially with the rotor core around the outer periphery thereof, which method comprises measuring the width of the stator core in the radial direction prior to assembling the stator core and the rotor core, also measuring the position of an outer periphery of the stator core from the axis of the rotor core after the assembling, calculating the position of an inner periphery of the stator core from the axis of the rotor core based on the difference between the result of measurement of the width of the stator core in the radial direction measured prior to the assembling and the result of measurement of the position of the outer periphery of the stator core from the axis of the rotor core after the assembling, and further calculating the difference between the position of the inner periphery of the stator core and the position of the outer periphery of the rotor core based on the results of the measurements, the thus-obtained difference being defined as an air-gap between the stator core and the rotor core.

2. The method as claimed in claim 1, wherein said width of the stator core is the width of a tooth of said stator core.

3. The method as claimed in claim 2, wherein said width of the stator core is measured for each tooth.

4. The method as claimed in claim 2, wherein said width of the stator core is measured for selected teeth of the stator core at a predetermined interval.

5. The method as claimed in claim 1, wherein said measurement of the outer periphery of the stator core after the assembling is carried out by supporting the generator on the core shaft using a jig.

6. The method as claimed in claim 5, wherein said generator is supported at a groove provided on each end of the core shaft.

7. The method as claimed in claim 1, wherein the measurement of the outer periphery of the stator core is started at a position corresponding to a groove provided on the stator core.

* * * * *